Patented June 3, 1947

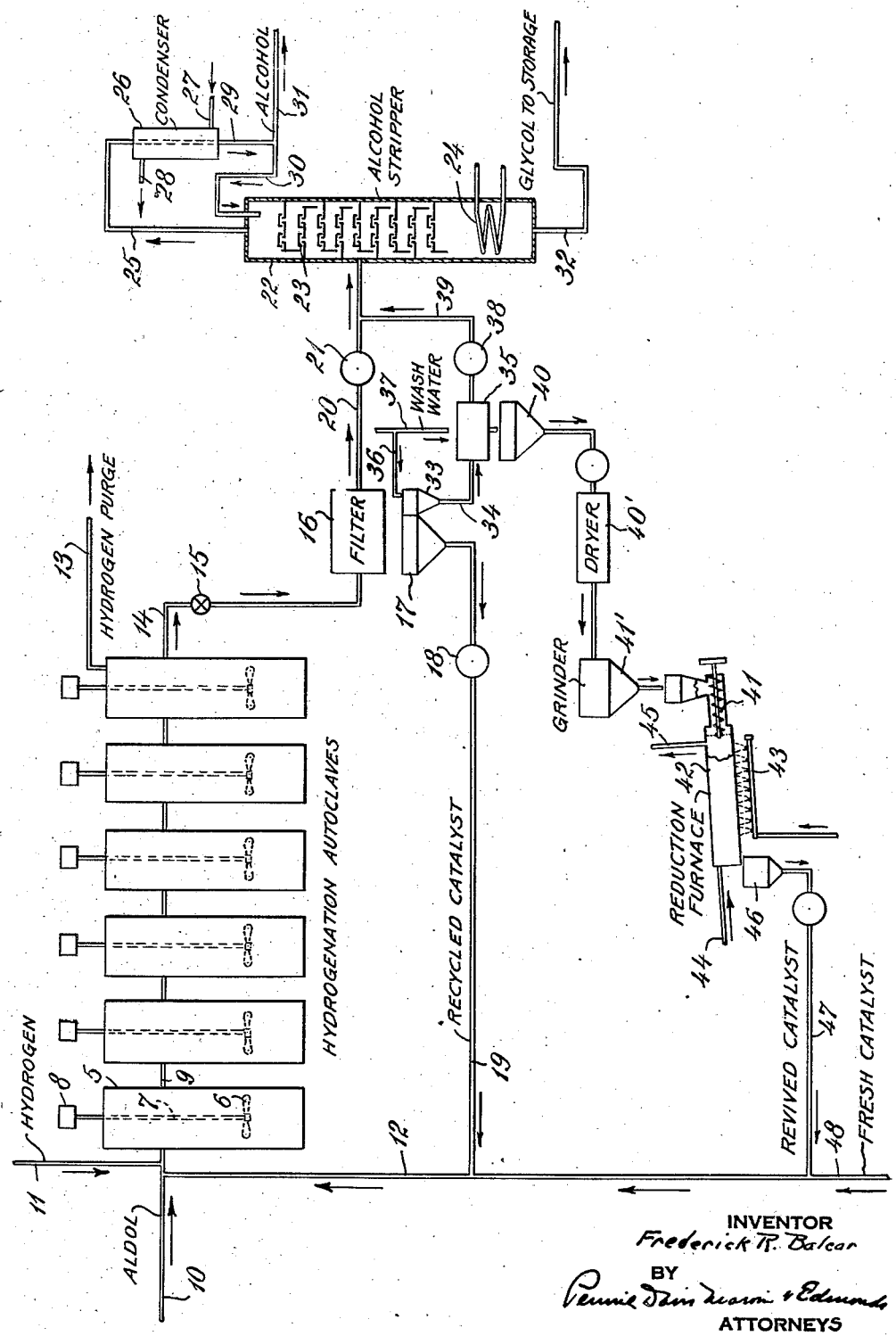

2,421,451

UNITED STATES PATENT OFFICE 2,421,451

PRODUCTION OF 1,3-BUTYLENE GLYCOL

Frederick R. Balcar, Stamford, Conn., assignor to Air Reduction Company, Incorporated, New York, N. Y., a corporation of New York Application March 19, 1943, Serial No. 479,771

3 Claims. (Cl. 260—635)

This invention relates to the continuous conversion of aldol to produce 1,3-butylene glycol in a commercially practicable manner to permit industrial utilization.

Butylene glycol has been prepared heretofore in various ways, but the methods available are not economically suited to large scale production. Hence the quantities of butylene glycol which are available are insufficient to meet the present demand.

It is the object of the invention to provide a simple and economically efficient procedure to effect the conversion of aldol to 1,3-butylene glycol by catalytic reduction with hydrogen.

Another object of the invention is the provision of a method permitting utilization of the catalyst in a cyclic operation and the progressive revivification thereof without interfering with the reduction.

Other objects and advantages of the invention will be apparent as it is better understood by reference to the following specification and the accompanying drawing diagrammatically illustrating an apparatus suitable for the practice of the invention.

The reduction of aldol to 1,3-butylene glycol occurs according to the following reaction:

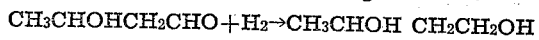

$$CH_3CHOHCH_2CHO + H_2 \rightarrow CH_3CHOH\ CH_2CH_2OH$$

The reduction requires the presence of hydrogen and a hydrogenation catalyst and intimate contact of these elements with the aldol at elevated pressure, as for example, by suitable agitation of the mixture. In order that the operation may be conducted continuously, I provide for the continuous flow of the aldol with the catalyst suspended therein through a multiplicity of chambers wherein the mixture is subjected to agitation in the presence of hydrogen. As the result of this procedure the aldol, together with the catalyst and the hydrogen, can be introduced at one end of the series of chambers and the product of the reaction, together with the catalyst, can be separated from the hydrogen and withdrawn continuously from the final chamber. The reaction occurs more or less rapidly in the first chamber and thereafter more slowly, but a sufficient number of chambers can be provided to complete the reaction substantially before the reaction product is withdrawn. Another advantage is that the autoclaves can be heated to different temperatures, the temperature preferably increasing in successive autoclaves. Thus the tendency of the speed of reaction to decrease is overcome. The higher temperature, which would be inadvisable in the presence of concentrated aldol, is practicable after partial hydrogenation. Consequently it becomes possible to operate continuously and more economically than is possible if the hydrogenation is effected in a single vessel.

Any suitable hydrogenation catalyst may be employed, but I prefer to use finely divided nickel. The finely divided catalyst is added to the aldol before it enters the first chamber of the series and remains in suspension as the liquid proceeds from chamber to chamber. When the reaction product is withdrawn, the finely divided catalyst may be separated by filtration or otherwise, and the major portion thereof may be returned directly and mixed with aldol entering the first chamber. The recycling of the catalyst effects a further advantage in the maintenance of continuous operation, since it is unnecessary at any point to stop the reaction for the purpose of removing and revivifying the catalyst.

Since the catalyst slowly loses its activity, I provide for the progressive revivification of a portion of the catalyst which is returned as fresh catalyst with the recycled portion to maintain the necessary proportion of catalyst in the reacting mixture. Thus a portion of the catalyst which is filtered from the reaction product can be washed with water and delivered to a suitable revivification apparatus. Conveniently this portion of the catalyst may be heated in a revolving furnace to the necessary temperature in the presence of hydrogen, so that it may be re-utilized as a catalyst in the operation. In accordance with this procedure, there is no substantial loss of the catalyst and no interruption in the operation.

In carrying out the invention, I prefer to employ a plurality of jacketed pressure receptacles 5, usually termed autoclaves, which are capable of sustaining a pressure of 300 pounds per square inch or more. The autoclaves may be heated to temperatures ranging from 45° to 120° C. Initial temperature is preferably 60° C., the temperature rising in successive autoclaves to preferably about 100° C. Each of the vessels is provided with an agitator 6 on a shaft 7 which may be actuated by any suitable means such as a motor 8. The vessels 5 are connected by pipes 9 which permit continuous flow of the liquid therein from one vessel to the other successively. Aldol, usually containing some acetaldehyde and water, is supplied through a pipe 10 to the first vessel 5, together with hydrogen introduced through a pipe 11, and the catalyst suspended in a suitable medium which is introduced through the pipe 12. The hydrogen should be at a pressure of about 300 pounds per square inch, and the mixture entering the first receptacle 5 is agitated therein, flows through the pipe 9 to the second receptacle for further agitation, and thence successively through each of the receptacles until the reaction is substantially completed in the last receptacle. Hydrogen may be withdrawn from the latter through a pipe 13. The reaction product is withdrawn through a pipe 14 controlled by a valve 15 and delivered to a filter 16, preferably of the continuous type which separates the catalyst from the liquid product. The bulk of the catalyst is delivered to a collector 17 and transferred by a pump 18 and pipe 19 to the pipe 12 which returns it to the reaction.

The filtrate is withdrawn through a pipe 20 and delivered by a pump 21 to a column 22 having the usual trays 23 and a heating coil 24. Rectification of the liquid in the column 22 results in an effluent consisting of alcohol and water. The alcohol and water vapors escape through a pipe 25 which is connected to a condenser 26. Cooling water is supplied by a pipe 27 and withdrawn through a pipe 28. A portion of the condensate delivered through the pipe 29 may be returned as reflux through a pipe 30. The balance is withdrawn through a pipe 31. The 1,3-butylene glycol is withdrawn at the foot of the column through a pipe 32 and delivered to storage.

A portion of the catalyst separated by the filter 16 is delivered to a collector 33 and thence through a pipe 34 to a washer 35. Water is supplied through pipes 36 and 37 to the collector 33 and the washer 35. The water is withdrawn by a pump 38 and returned by a pipe 39 to the product entering the column 22.

The washed catalyst enters a collector 40. It is pumped into a dryer 40' where it is dried at 100°–110° C., and thence delivered to a grinder 41'. The ground catalyst is delivered by a conveyor 41 to a suitable reduction furnace, preferably a revolving furnace 42, heated to the required temperature, approximately 300° to 550° C., by a burner 43 and supplied with hydrogen through a pipe 44. The hydrogen may be withdrawn through a pipe 45. The catalyst is delivered to a collector 46 and returned by a pipe 47 to a pipe 48 which supplies fresh catalyst to the reaction to make up for the portion separated in the collector 33. The catalyst cycle is thus completed. The major part of the catalyst is returned continuously to the reaction and a portion thereof is continuously revivified and returned as fresh catalyst, thus maintaining the continuity of the reaction. Any catalyst losses can, of course, be made up by suitable additions.

The procedure as described affords a practicable and satisfactory operation permitting production of butylene glycol from aldol at a minimum operating cost. Control is simple and practically automatic, so that when the operation has been started little attention is required to maintain satisfactory production.

Various changes may be made in the form and arrangement of the apparatus and in the procedure as described without departing from the invention or sacrificing the advantages thereof.

I claim:

1. The method of continuously converting aldol to 1,3-butylene glycol which comprises substantially continuously causing a mixture of aldol and a hydrogenation catalyst to flow in the presence of hydrogen under an elevated pressure through a succession of chambers each at a higher temperature within the range between 45° and 120° C., agitating the mixture in each chamber, withdrawing the reaction product continuously from the final chamber, separating the catalyst from the reaction product, returning a portion of the catalyst for re-use in the reaction, continuously revivifying the remainder of the catalyst to provide fresh catalyst, and thereafter returning the fresh catalyst for re-use in the reaction.

2. The method of continuously converting aldol to 1,3-butylene glycol which comprises substantially continuously causing a mixture of aldol and a hydrogenation catalyst to flow in the presence of hydrogen under an elevated pressure through a succession of chambers each at a higher temperature within the range between 45° and 120° C., agitating the mixture in each chamber, withdrawing the reaction product continuously from the final chamber, separating the catalyst from the reaction product, returning a portion of the catalyst for re-use in the reaction, continuously revivifying the remainder of the catalyst by heating it in an atmosphere of hydrogen to provide fresh catalyst, and thereafter returning the fresh catalyst for re-use in the reaction.

3. The method of substantially completely converting aldol to 1,3-butylene glycol, which comprises substantially continuously passing a mixture of aldol and a hydrogenation catalyst in the presence of hydrogen through a series of reaction zones under a superatmospheric pressure, agitating the reaction mixture in each zone, subjecting the reaction mixture in the series of zones to successively increasing temperatures, the range of temperature from the first to the last zone being from 45° C. to 120° C., substantially continuously withdrawing the reaction mixture from the last zone, substantially continuously separately separating the hydrogenation catalyst and the 1,3-butylene glycol therefrom, substantially continuously dividing the separated catalyst into two portions, substantially continuously returning one portion of the separated catalyst for reuse in the reaction, substantially continuously revivifying the other portion of the separated catalyst to provide fresh catalyst, and thereafter returning the fresh catalyst for re-use in the reaction.

FREDERICK R. BALCAR.

REFERENCES CITED

The following references are of record in the file of this patent:

UNITED STATES PATENTS

| Number | Name | Date |
| --- | --- | --- |
| 1,961,980 | Mueller-Cunradi et al. | June 5, 1934 |
| 1,940,651 | Semmes | Dec. 19, 1933 |
| 2,206,729 | Pier et al. | July 2, 1940 |
| 2,333,851 | Egloff | Nov. 9, 1943 |

FOREIGN PATENTS

| Number | Country | Date |
| --- | --- | --- |
| 309,200 | Great Britain | Mar. 28, 1929 |
| 348,248 | Great Britain | May 14, 1931 |
| 356,603 | Great Britain | Sept. 10, 1931 |
| 668,103 | France | Oct. 28, 1929 |
| 853,752 | France | Mar. 28, 1940 |
| 394,116 | Germany | Apr. 12, 1924 |

OTHER REFERENCES

Ellis, "Hydrogenation of Organic Substances," third edition, pp. 388–90 (1930). (Copy in Div. 6.)